(12) United States Patent
Flower

(10) Patent No.: US 6,681,486 B2
(45) Date of Patent: Jan. 27, 2004

(54) METHOD OF FORMING BRUSH SEALS BETWEEN ROTATING COMPONENTS

(75) Inventor: Ralph Franklin John Flower, Devizes (GB)

(73) Assignee: Cross Manufacturing Company (1938) Limited, Avon (GB)

( * ) Notice: Subject to any disclaimer, the term of this patent is extended or adjusted under 35 U.S.C. 154(b) by 0 days.

(21) Appl. No.: 10/168,292
(22) PCT Filed: Dec. 21, 2000
(86) PCT No.: PCT/GB00/04923
§ 371 (c)(1),
(2), (4) Date: Jun. 19, 2002
(87) PCT Pub. No.: WO01/48404
PCT Pub. Date: Jul. 5, 2001

(65) Prior Publication Data
US 2002/0189096 A1 Dec. 19, 2002

(30) Foreign Application Priority Data
Dec. 24, 1999 (GB) .............................................. 9930620

(51) Int. Cl.⁷ ................................................. B23P 15/00
(52) U.S. Cl. ........................ 29/889.2; 29/889.1; 29/521; 29/525; 29/888.3
(58) Field of Search ............................. 29/889.2, 889.1, 29/889, 505, 521, 525, 888.3; 415/173.7, 174.2, 173.3, 173.5, 174.5, 230, 231; 277/355

(56) References Cited

U.S. PATENT DOCUMENTS

| | | | |
|---|---|---|---|
| 3,917,150 A | * 11/1975 | Ferguson et al. | 228/159 |
| 4,204,629 A | * 5/1980 | Bridges | 228/160 |
| 4,218,189 A | * 8/1980 | Pask | 416/174 |
| 4,274,575 A | * 6/1981 | Flower | 228/160 |
| 4,934,759 A | * 6/1990 | Bridges | 300/11 |
| 5,496,045 A | * 3/1996 | Millener et al. | 277/355 |
| 5,715,596 A | * 2/1998 | Bintz | 29/888.02 |
| 5,961,279 A | * 10/1999 | Ingistov | 415/170.1 |
| 6,186,508 B1 | * 2/2001 | Zajchowski et al. | 277/355 |
| 6,226,975 B1 | * 5/2001 | Ingistov | 60/772 |
| 6,254,344 B1 | * 7/2001 | Wright et al. | 415/231 |
| 6,260,269 B1 | * 7/2001 | Turnquist et al. | 29/889.1 |
| 6,318,728 B1 | * 11/2001 | Addis et al. | 277/355 |
| 6,431,827 B1 | * 8/2002 | Wolfe et al. | 415/173.3 |
| 2001/0004145 A1 | * 6/2001 | Wright et al. | 277/355 |
| 2001/0030397 A1 | * 10/2001 | Beichl | 277/355 |
| 2002/0081195 A1 | * 6/2002 | Wolfe et al. | 415/173.3 |

* cited by examiner

Primary Examiner—I Cuda-Rosenbaum
(74) Attorney, Agent, or Firm—Andrus, Sceales, Starke & Sawall, LLP

(57) ABSTRACT

A method of assembly a brush seal between two components having confronting adjacent surfaces, such as the stator and rotor of a gas turbine, comprises providing a slot in one of the components which slot opens through the confronting surface of that component to face the other component. A flexible brush seal element having a plurality of metallic bristles is pushed into the slot so that the free ends of the bristles project from said surface of the one component. The element is then held in position in the slot by means of an anchoring strip pushed into the slot so as to bear on a wall thereof and also on the brush seal element, the anchoring strip typically being of a malleable metal.

15 Claims, 5 Drawing Sheets

METHOD OF FORMING BRUSH SEALS BETWEEN ROTATING COMPONENTS

CROSS-REFERENCE TO RELATED APPLICATIONS

This application is the U.S. national stage application of International Application PCT/GB00/04923, filed Dec. 21, 2000, which international application was published on Jul. 5, 2001, as International Publication WO 01/48404 in the English language. The International Application claims priority of Great Britain Patent Application 9930620.1 filed Dec. 24, 1999.

This invention relate's to a method of forming a brush seal between two relatively movable components. The invention further relates to a brush seal when formed by the method, and a machine having such a brush seal.

Brush seals are widely used in the rotating machinery art, to effect seals particularly in gas turbines, jet engines and other circumstances where there is one component which rotates at a relatively high rotational rate with respect to another component, and where there are arduous operating conditions such as high temperatures, corrosive gases and high pressures. A typical gas turbine or jet engine has a housing in which is rotatably mounted a rotor. A brush seal arranged to effect a seal between the housing and the rotor may have an annular carrier plate adapted to be mounted on the housing so as to surround with clearance the rotor shaft. The radially outer part of the carrier plate has a plurality of inwardly projecting bristles secured thereto, the length of the bristles being accurately finished so that the free bristle tips lightly wipe on the surface of the rotor shaft. The carrier plate should be mounted so that it is on the low pressure side of the seal and thus supports the bristles except for the tips of the bristles projecting beyond the carrier plate.

There have been proposed many improvements to the basic design of brush seal discussed above. One particular area which has been addressed is the need to undertake major dismantling of the machine in the event that a worn or damaged brush seal is to be replaced by a new seal. For example, it is known to provide the carrier in two or more arcuate pieces which accurately interfit and each of which supports a respective segment of the complete brush seal, so that when pieces of the carrier are all assembled to the housing of the machine, a continuous brush seal is formed around the shaft. When the seal is to be replaced, it may be removed in pieces without the need wholly to dismantle the machine.

More recently, it has been proposed to provide a carrier in annular pieces and having a T-shaped circumferential slot, for use with a flexible brush seal element having a T-shaped head at its radially outer end and which fits into the slot in the housing. When the seal is to be replaced, the old seal element may be slid out of the slot and a new element then fed into the slot. Support for the bristles is provided by the wall in the carrier on the low pressure side of the seal assembly and which defines the slot. Such a seal is both cheaper to produce and easier to fit but does still require some disassembly of the housing, since the carrier unit must be removed in one piece before it can be separated to give access to an end of the slot, to permit removal of the old brush seal element in insertion of the new element.

Another brush seal arrangement is shown in EP-0905421-A, where the fixing procedure for the seal element uses a member pressed into a slot within which the seal element is located. In order to guarantee the final position of the seal element, the bristles are held in a carrier which then locates against shoulders formed in a backing plate and the pressed-in fixing member, and in these components lock into a specially-formed slot in the housing. These complexities lead to significantly higher manufacturing costs for the housing, the brush seal element and the associated backing plate and fixing member.

The present invention aims at providing an improved method of assembling a brush seal between two relatively moveable components, which method uses a flexible brush seal element, and which permits easy and rapid replacement of the seal in the event that the seal becomes worn or damaged.

Accordingly, one aspect of the present invention provides a method of forming a brush seal between two relatively moveable components having confronting adjacent surfaces, comprising:

providing a flexible brush seal element comprising a plurality of metallic bristles arranged side by side and having their one ends fused together to form an elongate strip, the fused ends being turned to project laterally from the general plane of the elongate strip and the other ends of the bristles being substantially in alignment;

providing a slot in one of the components which slot opens into said surface of the one component to face the confronting surface of the other component, the width of the slot being greater than the thickness of the brush seal element in the region of the bristles thereof;

pushing the fused end of the brush seal element into the slot so that the other ends of the bristles project from said surface of the one component; and then pressing an anchoring strip into the slot which strip which bears on a wall of the slot and on the brush seal element to trap the laterally-projecting fused one ends of the bristles within the slot, so securing the brush seal element in defined position.

Though the method of this invention is primarily intended to effect a seal between relatively rotatable components, such as the rotor of a gas turbine or jet engine and a housing therefor, the method may be used to form a brush seal between other components. For example, a seal may be formed by the method between two generally planar components or even between two irregularly shaped components. However, in the following the invention will mainly be described with reference to the principal intended use, but the invention is not to be regarded as limited to that use.

It will be appreciated that by the method of the present invention, a brush seal may be fitted to a housing so long as there is access to the surface of the housing which faces the moving component to which a seal is to be made. Though generally the slot would be formed in a carrier bolted or otherwise suitably affixed to the main engine housing, in fact the slot could be formed directly in the housing of the engine or other machine. Since access is not required to a circumferential end of the slot, for most installations, it will be sufficient to remove the shaft from the housing, or to move that part of the housing in which the seal is to be installed away from the shaft, which ever is the most convenient. The removal of the worn or damaged seal is performed by pulling out of the slot the projecting parts of the bristles and though this is likely to cause further damage to the seal element, this generally is not a problem since the seal ordinarily would be regarded as scrap, before removal.

The bristles making up the brush seal element could have their one ends (that is, for a "conventional" gas turbine or jet engine brush seal, the radially outer ends of the bristles)

fused together by a simple welding or brazing process. For example, the bristles could be suitably arranged in a clamping device holding the greater part of the length of the bristles but with their one ends exposed, the welding or brazing process then being performed on those exposed ends. The volume of filler material used during such a welding or brazing process may be controlled so that the shape and dimensions of the fused-together ends falls within certain predefined limits but giving the brush seal element an enlarged head at the one ends of the bristles, turned to project laterally from the general plane of the strip.

Another possibility for the manufacture of the brush seal element may include wrapping the bristles around a filler wire extending along the length of the brush seal element and then fusing the bristles to that filler wire. In this case, each bristle may be sufficiently long, prior to wrapping around the filler wire, to permit the two ends of each bristle to lie adjacent one another, when wrapped round the filler wire.

Following the fusing of the one ends of the bristles, that fused end of the brush seal element may be finished for example by a grinding or machining operation so as to give the fused end a predefined bead-like profile. Then, the length of the bristles should be accurately finished, again by a grinding or other operation on the free ends of the bristles, using the fused end as a reference surface.

The slot in the one component may be of simple rectangular cross-section, with the fused end of the brush seal element accommodated against the base wall of the slot—and in the typical application for a gas turbine, that base wall would be the radially outer end of the slot. In such a case, the anchoring strip should simply be pressed into the slot following the positioning of the seal element therein, the strip bearing on one face of the bristles of the element and on the opposed wall of the slot. The anchoring strip should be pressed fully home, so as to bear against the fused end of the brush seal element, forcing that part of the seal against the base wall of the slot, using a special tool which deforms the anchoring strip to ensure retention of the brush seal element in the slot and the sealing of the element thereto.

Another possibility includes the provision of a slot having an undercut portion at the base end of the slot, whereby the fused end of the flexible brush seal element may at least partially be accommodated in that undercut portion. In this way, distortion of the fused end of the seal by the insertion of the anchoring strip may be minimised.

The component in which the slot is formed may comprise a part of the overall housing of the rotary machine, or may comprise a separate carrier which is adapted to be secured to the housing. The latter arrangement is preferred, as the degree of dismantling to change a worn or damaged seal may be minimised; on releasing the carrier from the housing, the carrier may simply be slid axially off the rotor shaft to give access to the carrier bore for changing the seal element.

A support plate may be positioned between the anchoring strip and the brush seal element, which support plate serves to support the bristles on the side thereof remote from the wall of the housing engaged by the bristles. Such a support plate preferably extends for substantially the entire depth of the slot, so as to support the majority of the length of the bristles, whereby the free ends of the bristles may still perform the required sealing function.

In the case of a seal for use with a shaft which may rotate in either direction with respect to the component in which the seal is mounted, the bristles may extend strictly radially from the with respect to the shaft. The bristles may similarly project for a case where the two components move relative to one another in the plane of the confronting surfaces. If however a shaft always rotates in one sense, then the bristles may lie at an angle to the true radial direction, so as to perform a wiping action over the surface of the shaft. Such an arrangement permits easy deflection of the bristles should the shaft perform minor perturbations about its mean position—for example, in the case of a gas turbine rotor which may normally run at many tens of thousands of rpm, the rotor may pass through periods of vibration as it runs up to normal speed. Other possibilities include providing a seal with two layers of bristles arranged with one layer overlying the other, but with the bristles of one layer at the opposite angle to that of the other layer, with respect to the true radial direction.

This invention extends to a brush seal assembly arranged to form a seal between two relatively movable components, whenever assembled by a method of this invention. Further, this invention also extends to a machine with two relatively moveable components whenever provided with a brush seal by a method of this invention, and to a machine having two relatively movable components and a brush seal assembly of this invention installed between those two components.

By way of example only, several specific embodiments of brush seal assembled by a method of this invention will now be described in detail, reference being made to the accompanying drawings, in which.

Figure 1:
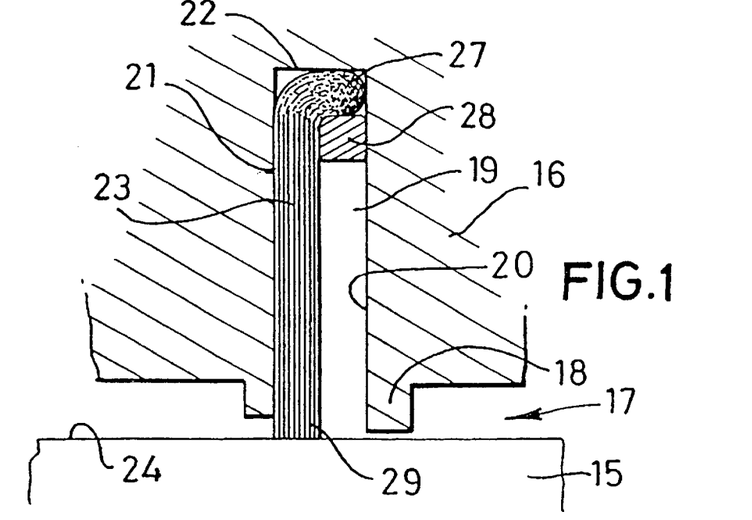
FIG. 1 is a diagrammatic cross-section through a basic brush seal assembly of this invention, as a first embodiment thereof.

Referring initially to FIG. 1, there is shown a part of a rotary machine such as a gas turbine engine having a rotor shaft 15 mounted for rotation within a housing 16, the housing defining a bore 17 through which the shaft extends. The bore is machined so that there is a leg 18 arranged closely to surround the shaft 15 and there is a slot 19 extending radially outwardly into the housing, from the bore 17. The slot 19 is of simple rectangular cross-sectional shape and has a high pressure side wall 20, an opposed low pressure side wall 21 and a base wall 22. The housing could be a separate carrier, releasably attached to the main housing of the rotary machine.

Figures 2, 3:
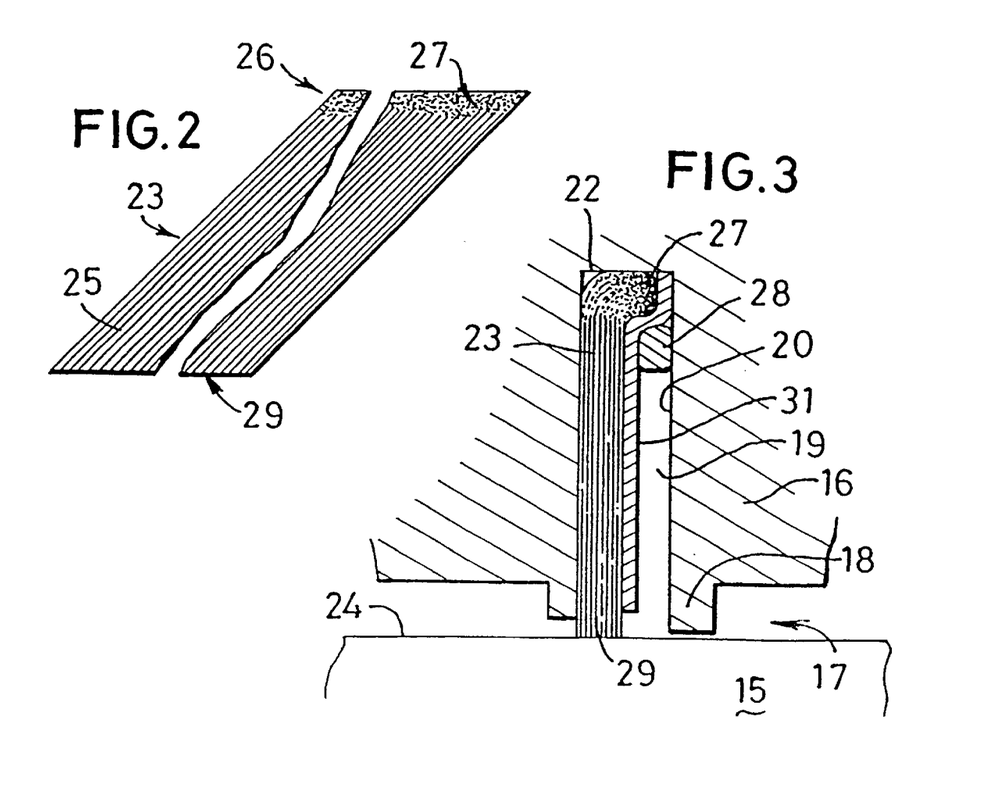
FIG. 2 is an end view on a part only of the brush seal element used in the first embodiment.
FIG. 3 is a view similar to that of FIG. 1, but of a modified form of the first embodiment of brush seal assembly.

A flexible brush seal element 23, shown also in FIG. 2, is mounted in the slot 19 in order to effect a seal between the housing 16 and the external circumferential surface 24 of the shaft 15. The brush seal element 23 comprises a plurality of individual bristles 25 each made of metallic wire and having their one ends 26 (that is, their radially outer ends) fused together either by a welding process or a brazing process, thereby forming a bead 27 extending along the length of the element 23. Each bristle extends at a common angle to the true radial direction, or to a tangent to the surface at the point of contact of the bristle tip with the surface, though the bristles could, for some applications, extend in the true radial direction or normally to said tangent, as appropriate.

The brush seal element 23 is held in the slot 19, with the bead 27 bearing on end wall 22 of the slot 19 by means of an anchoring strip 28 pressed into the slot 19, after insertion of the seal element. The anchoring strip 28 is typically made of a malleable metal such as soft stainless steel or a soft nickel or cobalt ally, though for less demanding applications, soft iron, copper, a bronze alloy or an aluminium alloy may be used. The strip is forced into the slot 19 between the high pressure side wall 20 of the slot and the surfaces of the bristles facing that slot by a special tool which deforms the strip securely to hold the element in the slot and to effect a seal between the element and the walls of the slot.

Following the fusing together of the bristles forming the brush seal element 23, the fused one ends 26 are machined or subjected to a grinding operation, so as to impart to the fused end a predetermined profile and thickness. Then, the bristles of the brush seal are clamped using the machined or ground fused end as a reference surface, so that the free ends 29 of the bristles may be finished to an exact length, to within very close tolerances, from the reference surface. This may be performed either with the brush seal element held lineally, or curved into an arcuate shape, at the same radius or curvature as that at which the seal will be employed.

The pressure applied to the anchoring strip 28 should be sufficiently high to ensure plastic deformation of the anchoring strip, so as firmly to engage the bead 27 of the brush seal element with the end wall 22 and also to wedge that strip between the high pressure side wall 20 and the bristles immediately adjacent the bead 27. In this way, the brush seal element will be held securely in position for service as a seal. To facilitate the insertion of the anchoring strip 28, the end of the high pressure side wall 20 adjacent the shaft 15 may be bevelled slightly, thereby giving a lead for the anchoring strip.

In the event that the brush seal element 23 becomes worn or damaged when in service, the element may easily be removed following removal of the housing, by grasping the projecting free ends 29 of the bristles and pulling the entire seal element out of the slot 19, the anchoring strip 28 being drawn out with the seal element, following which a new brush seal element may be installed, together with a new anchoring strip 28

Throughout the following description of modifications to the embodiment described above and alternative embodiments, the same reference numbers are used to denote the same, or substantially the same, components; insofar as is appropriate, those components will not be described again.

In the modified form of seal assembly shown in FIG. 3, a support plate 31 is fitted into the slot 19 simultaneously with the insertion of the brush seal element 23, so as to lie between the bristles on the high pressure side of the seal element and the high pressure side wall 20 of the slot. Then, the anchoring strip 28 is pressed into the slot 19, between the support plate 31 and the high pressure side wall 20. In this way, the risk of damage to the bristles on the high pressure side of the seal element 23 during insertion of the anchoring strip 28 may be obviated. Moreover, the support plate 31 may serve to support the bristles 25 against excessive flexing in the axial direction, should the pressure on the normally low pressure side of the seal momentarily increase above the pressure on the normally high pressure side of the seal.

Figure 4:
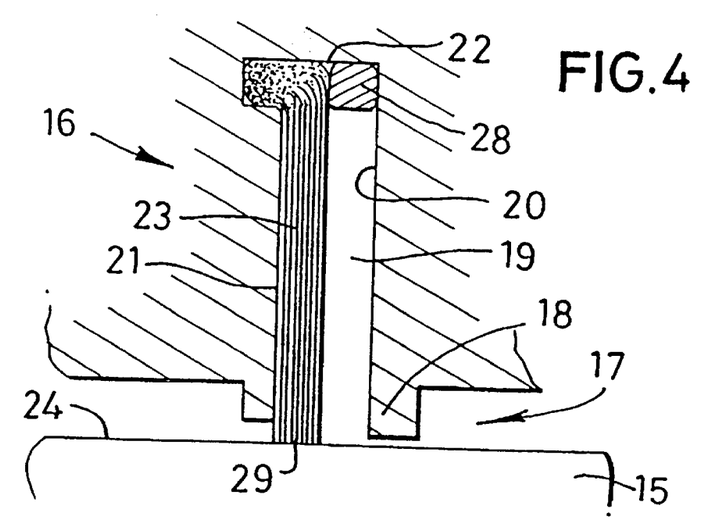
FIG. 4 is a cross-section through a second embodiment of brush seal assembly of this invention.

In the embodiment of FIG. 4, the slot 19 is modified so as to provide an undercut 32 joining into the main part of the slot, at the radially outermost end of the slot. In this case, the brush seal element 23 is inserted so that the bead 27 locates in the undercut 32, by moving the brush seal element in the axial direction once the seal has fully been inserted in the slot 19. Then, the seal is held in position by inserting the anchoring strip 28 between the bristles on the high pressure side of the seal and the high pressure wall 20. In this embodiment, the anchoring strip need be deformed only to a relatively small extent in order to hold the brush seal element in position.

Figure 5:
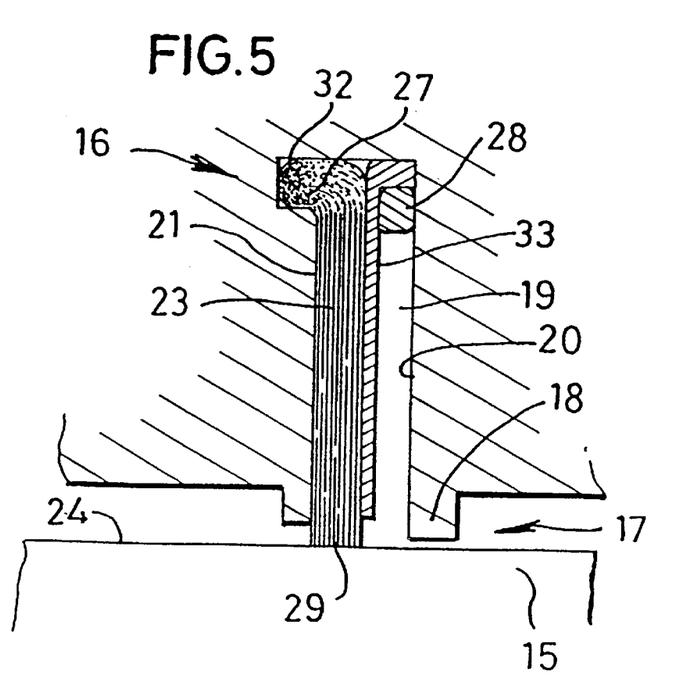
FIG. 5 illustrates a modified form of the second embodiment.

FIG. 5 shows a modified form of the assembly of FIG. 4. Here, a support plate 33 is provided between the high pressure side of the bristles and the high pressure side wall 20 of the slot, in essentially the same manner as has been described above in relation to FIG. 3. The support plate 33 fulfils the same functions as described for the support plate 31.

Figure 6:
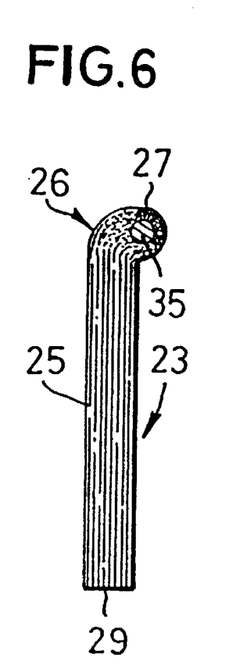
FIG. 6 is a cross-section through an alternative brush seal element for use in forming a brush seal of this invention.

FIG. 6 illustrates an alternative brush seal element design. Here, a filler wire 35 is provided along the edge of the seal element intended for location deepest into the slot 19, each bristle being of a sufficient length to be wrapped partially round the filler wire. Two constructions are possible; either each bristle extends just from the end of the seal element intended to effect a seal against some other component to the filler wire, but is partially wrapped round the filler wire, or each bristle could be of a sufficient length to extend from the end of the seal element intended to effect a seal against some other component up to and around the filler wire and back to lie adjacent the first end of the bristle. This second construction is shown in FIG. 6. Following wrapping of the bristles in this way, the bristles are fused together and to the filler wire, whereafter the brush seal element is finished in the same manner as has been described above concerning the shape and dimensions of the bead 27 and the length of the bristles extending therefrom.

Figure 7:
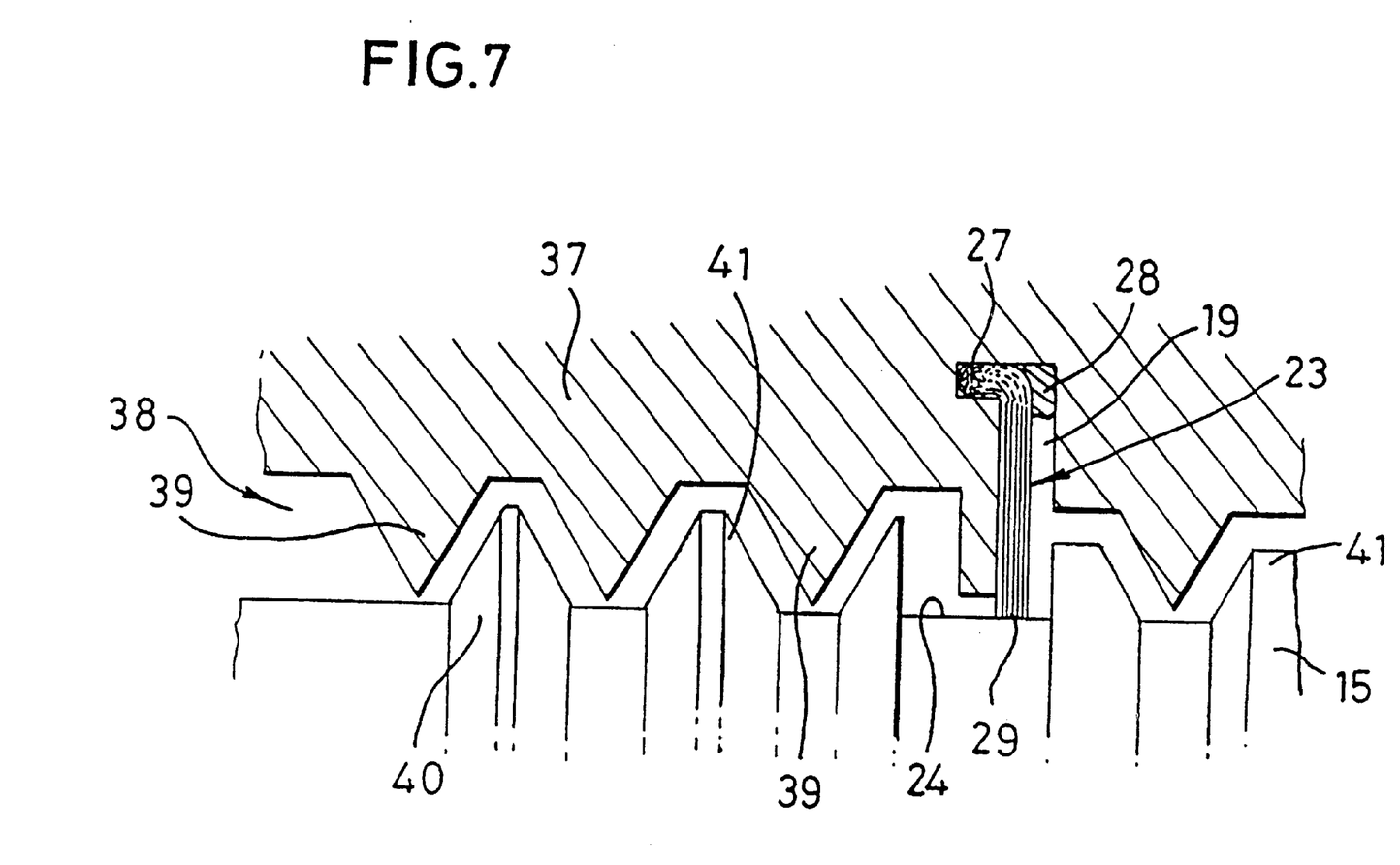
FIG. 7 shows the use of the brush seal element of FIG. 6 in conjunction with a labyrinth seal.

FIG. 7 illustrates the use of a brush seal assembly of substantially the same configuration as that shown in FIG. 4, but incorporated into a labyrinth seal. Here, the housing 37 in which the slot 19 is formed has a bore 38 profiled with a plurality of annular ribs 39, each of substantially triangular cross-sectional shape. Similarly, the shaft is machined to provide a labyrinth seal portion 40, the circumferential surface of the shaft having ribs 41 which interfit with the ribs 40 of the housing. In this way, an elongated leakage path for high pressure gas is provided, so enhancing the sealing effect of the brush seal element 23 fitted into the slot 19.

Figure 8:
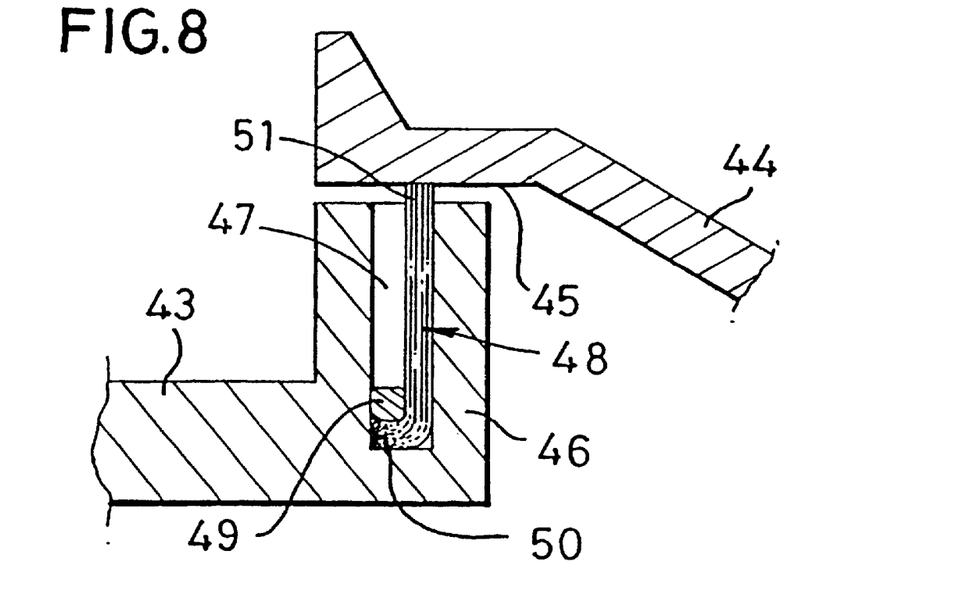
FIG. 8 shows an alternative brush seal assembly where the bristles project radially outwardly from an inner component to form a seal against an outer component.

FIG. 8 illustrates an alternative form of seal assembly. Here, a housing (not shown) for a rotatable component 43 has a flange 44 extending generally axially of the rotating component and having a cylindrical inner surface 45. The rotatable component has a boss 46 formed at its free end, in which boss there is a slot 47 of simple rectangular cross-sectional shape, and opening through the surface of the boss facing cylindrical surface 45. A brush seal element 48 is installed in the slot 47 by an anchoring strip 49 in the same manner as has been described above with reference to FIG. 1. The brush seal element 48 here is of a slightly different form from that of element 23 used in the embodiment of FIG. 1, in that the bristles extend radially outwardly from the bead 50 so that the free ends 51 may engage the cylindrical surface 45. As compared to the brush seal element 23, the packing density of the bristles needs to be higher, so that when the brush seal element is curved as shown, there is still a sufficient sealing effect between adjacent bristles despite the negative curvature of the seal element.

Figure 9:
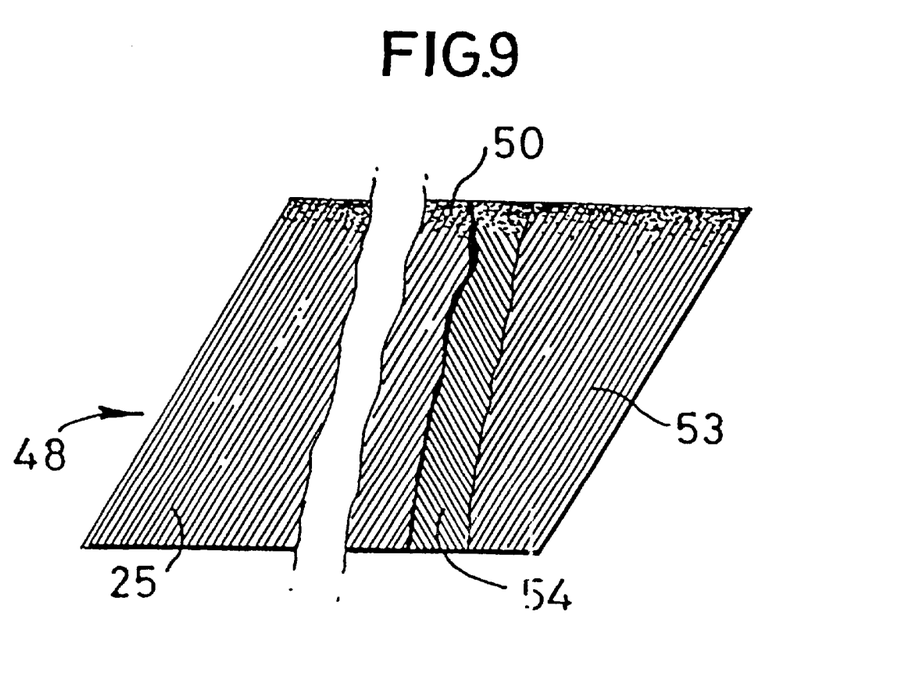
FIG. 9 is a view similar to that of FIG. 2, but on an alternative brush seal element for use in a brush seal of this invention.

FIG. 9 shows one way in which a sufficiently high packing density may be achieved, for a seal element such as is used in the arrangement of FIG. 8. Here, the bristles are arranged in two layers 53 and 54, with the bristles in each layer extending at an angle to the true radial direction but the bristles in each layer extending at opposed angles to each other. Such a seal element may conveniently be constructed by the technique as illustrated in FIG. 6, but by bending the bristles as they pass round the bead wire 35, before the fusing together of the bristles.

Figure 10:
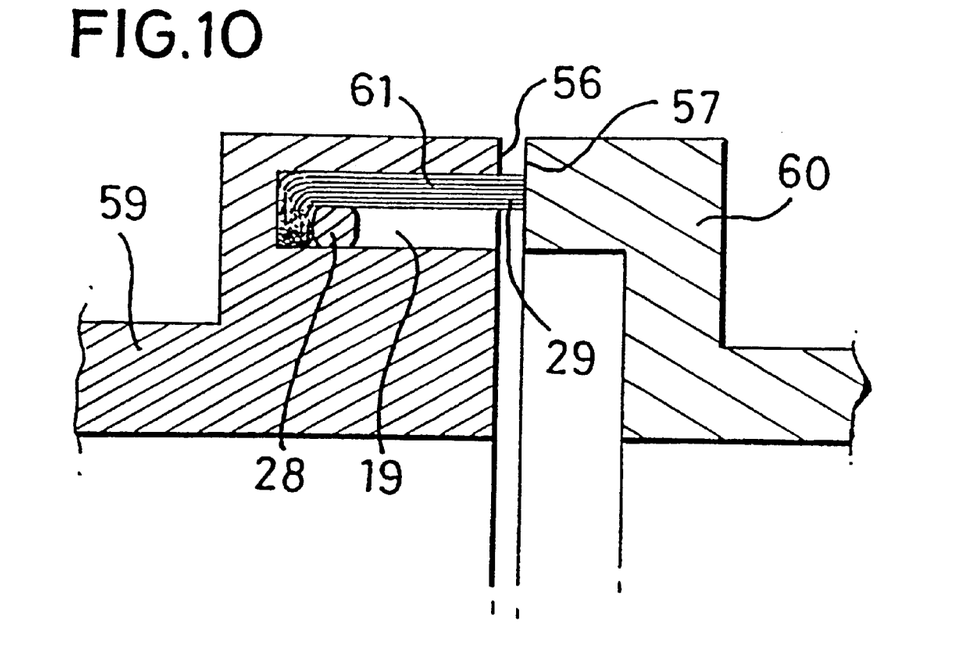
FIG. 10 shows an axial brush seal assembly, as a further embodiment of this invention.
Figure 11:
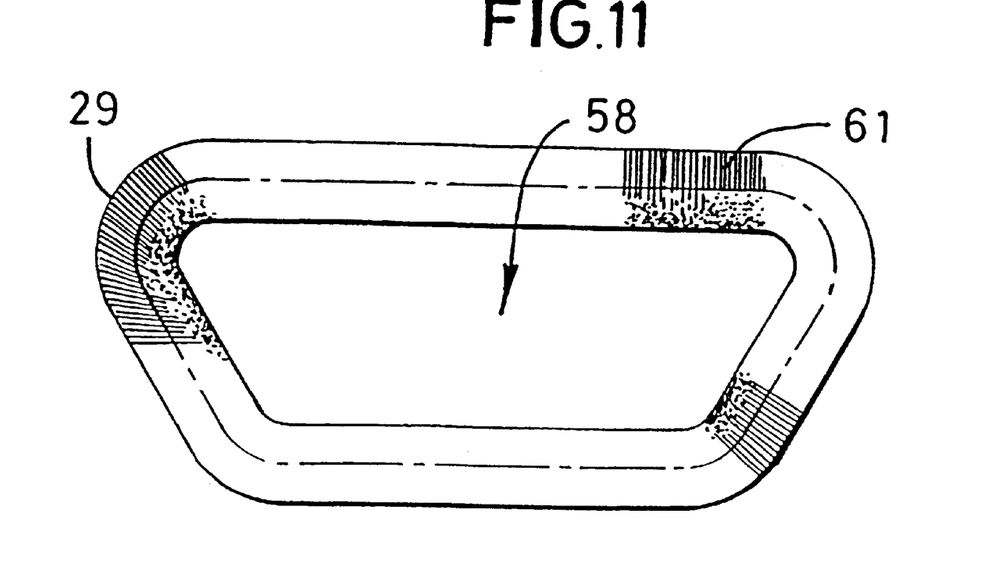
FIG. 11 is an end view on the seal assembly of FIG. 10.

FIGS. 10 and 11 illustrate a brush seal assembly of this invention being used to effect a seal between two planar surfaces 56 and 57 facing each other and provided on respective components 59 and 60. The brush seal 61 is arranged around an aperture 58 of an irregular shape, as best seen in FIG. 11. The brush seal element is manufactured in the same manner as element 23 (FIG. 1) or that of FIG. 6, and is installed in slot 19 in component 59, exactly as has been described above with reference to FIG. 1. When installed, the free ends 29 of the bristles project beyond surface 56 of component 59 so as to engage surface 57 of component 60.

When completed, the seal of FIGS. 10 and 11 allows the components to move relative to one another laterally, but not axially, whilst still maintaining a seal between the components.

What is claimed is:

1. A method of forming a brush seal between two relatively moveable components having confronting adjacent surfaces, comprising:
   providing a flexible brush seal element comprising a plurality of metallic bristles arranged side by side and having their one ends fused together to form an elongate strip, the fused ends being turned to project laterally from the general plane of the elongate strip and the other ends of the bristles being substantially in alignment;
   providing a slot in one of the components which slot opens into said surface of the one component to face the confronting surface of the other component, the width of the slot being greater than the thickness of the brush seal element in the region of the bristles thereof;
   pushing the fused end of the brush seal element into the slot so that the other ends of the bristles project from said surface of the one component; and then
   pressing an anchoring strip into the slot which strip bears on a wall of the slot and on the brush seal element to trap the laterally-projecting fused one ends of the bristles within the slot, so securing the brush seal element in a defined position.

2. A method as claimed in claim 1, in which the slot has an undercut at base end thereof, and the laterally-projecting fused one ends of the bristles are at least partially located in the undercut prior to the anchoring strip being pressed into the slot.

3. A method as claimed in claim 1, in which the anchoring strip used to secure the brush seal element in the slot is of a malleable metal.

4. A method as claimed in claim 3, in which the malleable metal is selected from one of a soft stainless steel, a soft nickel or cobalt alloy, soft iron, copper, a bronze or an aluminum alloy.

5. A method as claimed in claim 1, in which a support plate is disposed in the slot and is arranged to lie against the brush seal element before the anchoring strip is pressed into the slot to bear on a side wall of the slot and the support plate.

6. A method as claimed in claim 1, in which the one ends of the bristles are fused together by one of a welding or brazing process.

7. A method as claimed in claim 1, in which each bristle is at least partially wound round a filler wire prior to the bristles being fused together.

8. A method as claimed in claim 7, in which each bristle has its two ends substantially alongside each other, the central region of each bristle being wound at least partially around said filler wire.

9. A method as claimed in claim 1, in which each bristle extends normally with respect to a tangent to the surface at the point of contact of the bristle tip with that surface.

10. A method as claimed in claim 1 and for assembling a brush seal to effect a seal between a rotary component and a housing therefor, in which each bristle of the brush seal element extends substantially at the same angle to the true radial direction at the point of contact of the bristle tip with the rotary component.

11. A method as claimed in claim 1 for assembling a brush seal to effect a seal between a rotary component and a housing therefor, in which the brush seal has two layers of bristles overlying each other in the axial direction, the bristles of one layer lying at a different angle from the bristles of the other layer.

12. A method as claimed in claim 11, wherein the bristles of the two layers lie at equal and opposite angles to the true radial direction.

13. A method as claimed in claim 9, wherein the brush seal element is assembled into a housing defining the slot prior to the housing being assembled to a part of a rotary machine through which a rotary component extends.

14. A method of forming a brush seal between two relatively moveable components having confronting adjacent surfaces, comprising:
   providing a flexible brush seal element comprising a plurality of metallic bristles arranged side by side, each bristle being partially wound round a filler wire and having its two ends substantially alongside each other, the bristles being fused together at the filler wire to form an elongate strip, the fused bristles at the filler wire being turned to project laterally from the general plane of the elongate strip while the other ends of the bristles remain substantially in alignment;
   providing a slot in one of the components which slot opens into said surface of the one component to face the confronting surface of the other component, the width of the slot being greater than the thickness of the brush seal element in the region of the bristles thereof;
   pushing the fused bristles and filler wire of the brush seal element into the slot so that the ends of the bristles project from said surface of the one component; and then
   pressing an anchoring strip into the slot which strip bears on a wall of the slot and on the brush seal element to trap the laterally-projecting fused bristles and filler wire within the slot, so securing the brush seal element in a defined position.

15. A method of forming a brush seal between two relatively moveable components having confronting adjacent surfaces, comprising:

providing a flexible brush seal element comprising a plurality of metallic bristles arranged side by side, each bristle being partially wound round a filler wire and having its two ends substantially alongside each other, the bristles being fused together at the filler wire to form an elongate strip;

providing a slot in one of the components which slot opens into said surface of the one component to face the confronting surface of the other component, the width of the slot being greater than the thickness of the brush seal element in the region of the bristles thereof;

pushing the fused bristles and filler wire of the brush seal element into the slot so that the ends of the bristles project from said surface of the one component; and then pressing an anchoring strip into the slot which strip bears on a wall of the slot and on the fused bristles at the filler wire, sufficient force being applied to turn the fused bristles and filler wire to project laterally from the general plane of the elongate strip so as to trap the laterally-projecting fused bristles and filler wire within the slot, so securing the brush seal element in a defined position.

* * * * *